US012687978B1

(12) United States Patent
Siddabathula et al.

(10) Patent No.: US 12,687,978 B1
(45) Date of Patent: Jul. 21, 2026

(54) ENCRYPTED AND COMPRESSED DATA TRANSFER WITH PERFORMANCE OPTIMIZATION

(71) Applicant: Charter Communications Operating, LLC, St. Louis, MO (US)

(72) Inventors: Srihari Siddabathula, St. Charles, MO (US); Neelima Mumgandi, St. Peters, MO (US); Michael Sean Green, St. Charles, MO (US)

(73) Assignee: Charter Communications, St. Louis, MO (US)

( * ) Notice: Subject to any disclaimer, the term of this patent is extended or adjusted under 35 U.S.C. 154(b) by 0 days.

(21) Appl. No.: 19/073,511

(22) Filed: Mar. 7, 2025

(51) Int. Cl.
*G06F 12/00* (2006.01)
*G06F 3/06* (2006.01)
*G06F 21/60* (2013.01)

(52) U.S. Cl.
CPC ............ *G06F 3/064* (2013.01); *G06F 3/0626* (2013.01); *G06F 3/0673* (2013.01); *G06F 21/602* (2013.01)

(58) Field of Classification Search
CPC ...... G06F 3/064; G06F 3/0626; G06F 3/0673; G06F 21/602
USPC ........................................................ 711/171
See application file for complete search history.

(56) References Cited

U.S. PATENT DOCUMENTS

2020/0110670 A1 * 4/2020 Artico ................. G06F 11/1438

FOREIGN PATENT DOCUMENTS

| CN | 109416928 A | * | 3/2019 | ............. G16B 50/30 |
| KR | 20210044180 A | * | 4/2021 | ............... G06N 3/08 |
| WO | WO-2024223676 A1 | * | 10/2024 | ............... G06F 8/45 |

* cited by examiner

*Primary Examiner* — Mardochee Chery
(74) *Attorney, Agent, or Firm* — Mendelsohn Dunleavy, P.C.; Steve Mendelsohn

(57) ABSTRACT

A communication system communication system has a source location that communicates with a destination location via a network topology. A data extraction and processing gateway of the source location has a source CPU that divides and distributes incoming data to source GPU cores that transform, encrypt, and compress different blocks of data in parallel. A queue and transmission gateway of the source location has a traffic analyzer that transmits enqueued processed blocks of data via the network topology. The destination location has a loading gateway having a destination CPU that distributes received processed blocks of data to destination GPU cores that decompress, decode, and detransform the processed blocks of data in parallel to recover the blocks of data, which the CPU assembles for further processing.

12 Claims, 7 Drawing Sheets

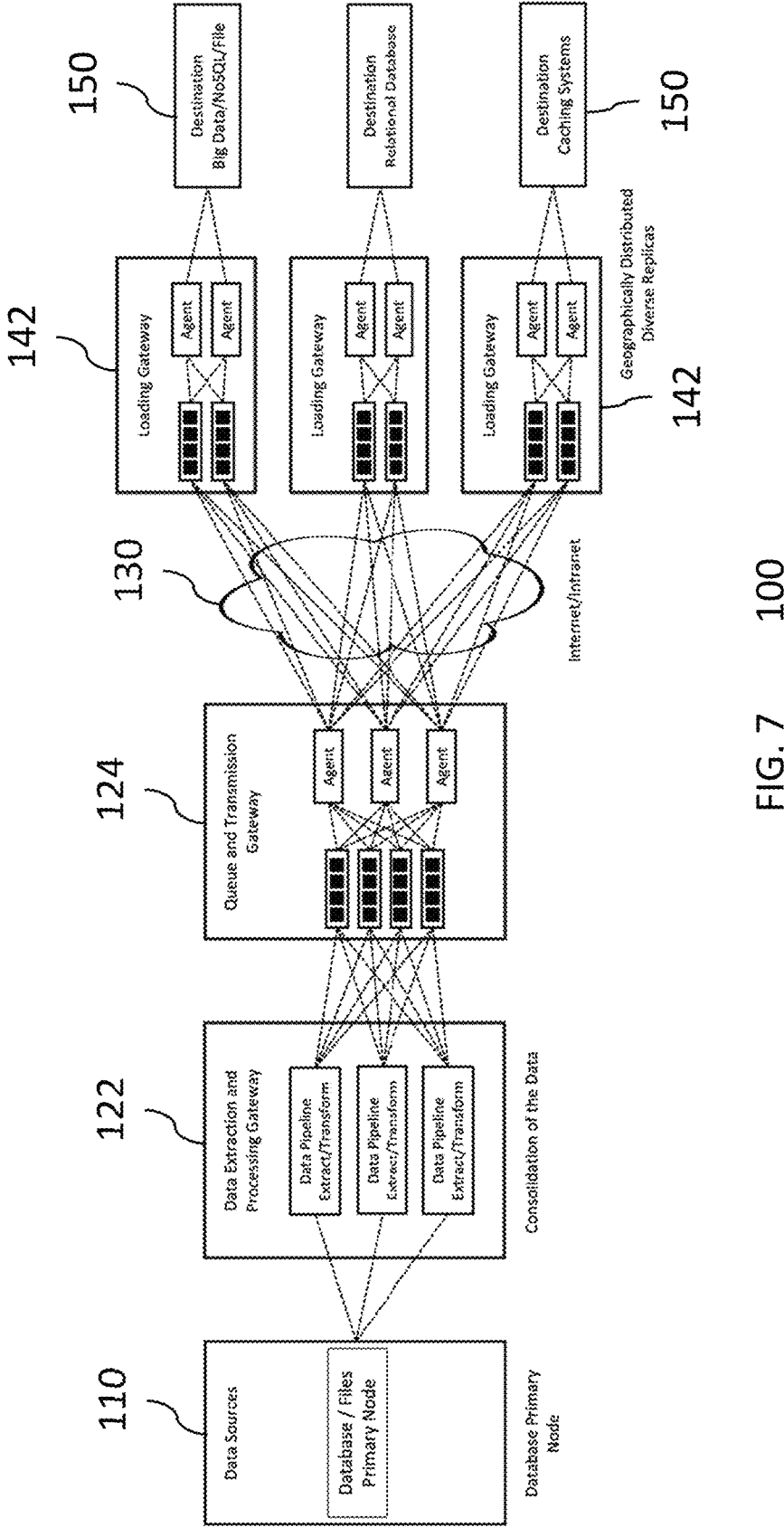
FIG. 7    100

ENCRYPTED AND COMPRESSED DATA TRANSFER WITH PERFORMANCE OPTIMIZATION

BACKGROUND

Field of the Disclosure

The present disclosure relates to communication systems and, more specifically but not exclusively, to techniques for secure and efficient data transfer in communication systems.

Description of the Related Art

This section introduces aspects that may help facilitate a better understanding of the disclosure. Accordingly, the statements of this section are to be read in this light and are not to be understood as admissions about what is prior art or what is not prior art.

Ensuring secure and efficient data transfer is paramount in real-time communication. However, as datasets grow in size and complexity, traditional sequential processing methods become increasingly inefficient. Traditional CPU-based encryption and decryption methods often struggle to meet the performance demands of modern applications, particularly in high-throughput environments such as cloud computing, financial transactions, and multimedia streaming. Lossless compression techniques are critical for reducing data size without sacrificing integrity, enabling faster transfer rates and reduced storage requirements. In modern network infrastructures, the ability to dynamically adjust routing paths based on real-time network conditions is critical for ensuring efficient data transfer, minimizing latency, and optimizing resource utilization.

SUMMARY

The safe distribution of data throughout a geographically and topologically diverse system can have a high resource cost of organizing, encrypting, and labeling at the point of send and the inverse at the point of read. To avoid these costs, data is typically aggregated together and transmitted as a group at the very end of the process (like data pipeline jobs), or virtual private networks are created to treat the networks as homogeneous-which is often not possible. These conventional compromises have several undesirable characteristics: latency in data consistency, data consumers must wait until the data has been updated in the databases before consuming the data (not allowed to be first class citizens), high costs of framework, timing in data triggering events, and scalability. If the resource costs of distribution of data could be reduced as to allow the system to perform its function within resource and time costs, then the undesirable characteristics would be removed.

Problems in the prior art are addressed in accordance with the principles of the present disclosure by a technique for accelerating the distribution of data throughout a geographically and topologically diverse system. The technique breaks apart the aggregated data into discrete elements for distribution across the system. Data enters a transmitting location where the discrete elements can be processed quickly (e.g., using GPU-accelerated data transformation), in parallel (e.g., using concurrent encryption and compression with massive parallel GPU processing), dynamically distributing the workload based on the requirements, scaling the resources to the task, and dynamically adjusting the distribution strategy based on latency. The data can then be transmitted via any means deemed useful since the data's security and receipt are guaranteed. A receiving location would reverse the process, allowing the data to be distributed between diverse geographical and topological networks. This can then be done at any point in the data's life cycle and doesn't need to wait until the data comes to rest in a database for consistency. Eventual consistency methods can be used. Lastly, this would allow any process that needs to consume data—like triggering emails for the creation of a record—to do so at the same time as the database does, allowing business the capability of choosing the expected outcomes without the artificial limitation prior methods placed on it.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 7 is a block diagram representing a third use case for the communication system of FIG. 1.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
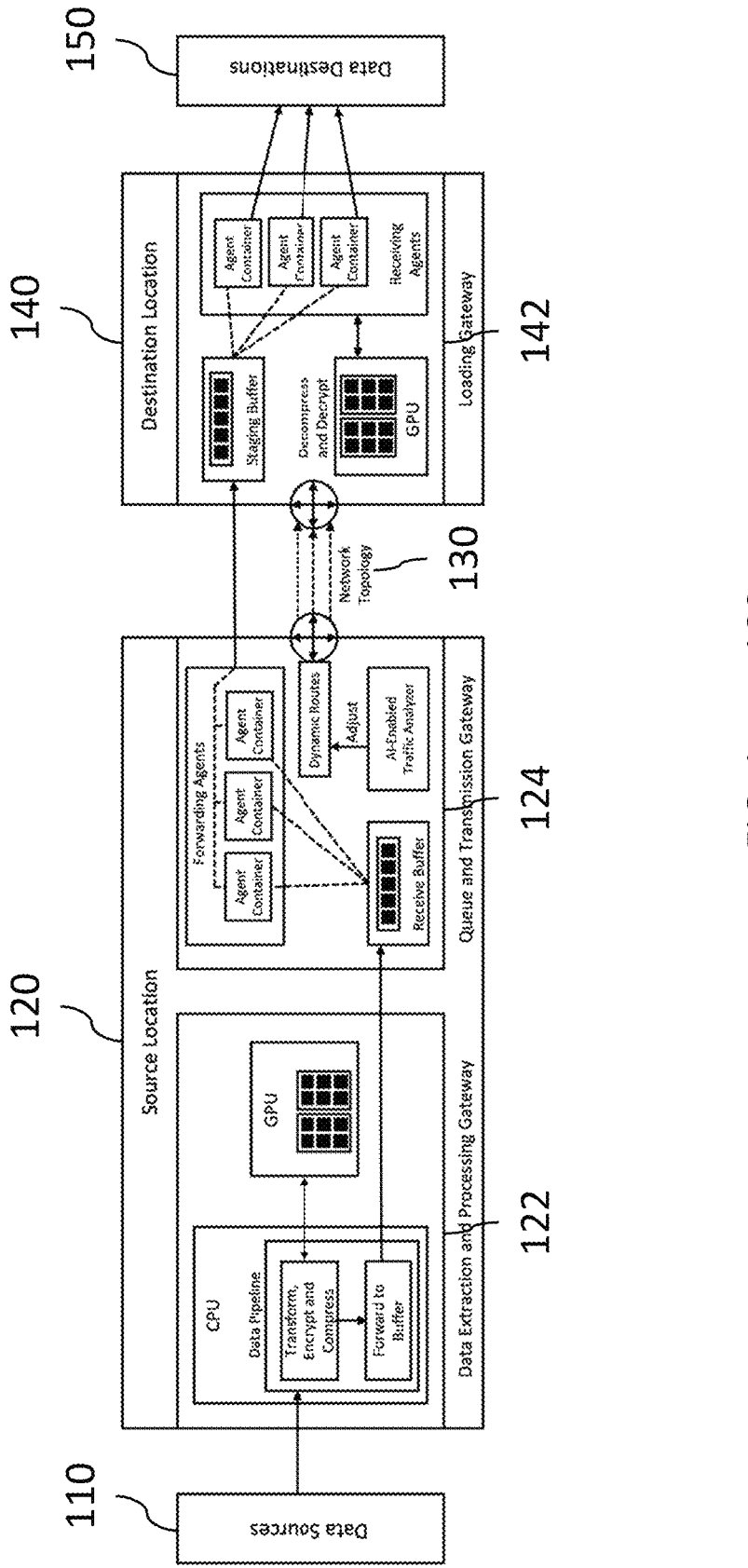
FIG. 1 is a block diagram of a portion of a communication system according to certain embodiments of the present disclosure.

FIG. 1 is a block diagram of a portion of a communication system 100 representing the transfer of data from one or more data sources 110 to one or more data destinations AF via an intervening communication network topology 130. To assist in that transfer of data, the system 100 includes (i) a data extraction and processing gateway 122 and a queue and transmission gateway 124 located at a source location 120 on the source side of the network topology 130 and (ii) a loading gateway 142 located at a destination location 140 on the destination side of the network topology 130.

The communication system 100 provides a comprehensive framework that seamlessly integrates all data pipeline functionalities (transformation, chunking, encryption/decryption, compression/decompression and loading) using the combination of CPU and GPU parallel processing and decoupling the data pipeline by distributing its components. This approach promises significantly enhanced data pipeline performance, scalability, and security, paving the way for more-efficient data integration and replication.

This approach offers several advantages over traditional systems. First, it enables the use of GPU parallel processing capability in data pipelines, independent scaling of each stage, optimizing resource utilization and performance. Second, it enhances fault tolerance by isolating failures, preventing them from cascading through the entire pipeline. Third, it fosters flexibility, allowing for independent modification and maintenance of each stage without disrupting others. Last, it lays the foundation for real-time data processing, enabling organizations to gain timely insights and make informed decisions.

The framework, as described above, is completely decoupled and can be deployed at any scale depending on the requirement. Each of the gateways is independent. The whole system, unlike the traditional systems, need not be deployed at both source and destination. Specific components are provisioned depending on the source and destination. With this approach, the cost of provisioning the system is significantly lowered and, at the same time, the data is moved to multiple destinations irrespective of the type of destination, thereby making the data available in real time to multiple consumers geographically.

This eco-system deals with numerous interconnected components, each with its own set of behaviors. Implementing such an ecosystem involves a broad and deep knowledge base, starting with creating complex frameworks, efficient task transfer between a CPU and a GPU for parallel processing, network topology routing, artificial intelligence (AI), machine learning (ML), and containerization & orchestration techniques.

To effectively implement this data pipeline system, specific requirements are addressed. The framework has a control plane that involves a robust task management framework capable of defining, scheduling, and monitoring individual operations. This framework supports dependency tracking, allowing for the creation of complex workflows where tasks rely on the output of preceding steps where necessary. Furthermore, the framework possesses the ability to efficiently serialize and deserialize data and instructions, enabling seamless communication between the CPU and GPU. For optimal performance, the CPU-based task scheduler minimizes overhead, efficiently distributing work to the GPU while maintaining a responsive and adaptable system. Knowledge on libraries and frameworks like Compute Unified Device Architecture (CUDA) or Open Computing Language (OpenCL) enable efficient data transfer between CPU and GPU memory, as well as for executing parallel computations by strategically using shared memory and optimizing load/store operations.

The specific CUDA or OpenCL API calls and kernel implementations will vary depending on the application and hardware. The framework can be designed to handle different GPU architectures and driver versions. Performance profiling tools can be used to identify bottlenecks and optimize the task transfer and kernel execution.

The framework can provide efficient memory allocation and data transfer between the CPU and GPU. The framework can minimize data transfers by keeping as much data as possible on the GPU. The framework can use pinned (page-locked) memory on the CPU to improve data transfer performance. The framework can utilize coalesced memory access patterns on the GPU. The encryption kernel (i.e., the code executed on the GPU) is optimized for the target GPU architecture. The framework can minimize thread divergence and maximize thread utilization.

A suitable block cipher mode of operation is chosen that supports parallel processing for encryption/decryption. Modes like CBC (Cipher Block Chaining) are avoided when maximum parallelization is needed, due to chaining.

Data dependencies between processing units are minimized. Algorithms can be restructured to reduce or eliminate sequential dependencies. Situations where the compression of one data block depends heavily on the results of compressing the previous block are avoided.

An AI-enabled traffic analyzer module includes the capability of collecting real-time network traffic data from various sources (e.g., routers, switches, servers, network probes) and monitoring key performance indicators (KPIs), such as latency, jitter, packet loss, and bandwidth utilization with regards to the destination loading gateway. Machine learning algorithms are employed for network traffic analysis and prediction utilizing real-time and historical network data to identify network congestion, bottlenecks, network anomalies & security threats, and potential disruptions and to predict future network conditions based on current and historical trends. Optimal network paths are calculated based on predicted network conditions, requirements, and destination, and network paths are dynamically adjusted in real time based on changing network conditions.

Agents (forwarding and receiving) are implemented as containers for scalability, security, and cost, and should be orchestration platform agnostic (e.g., Kubernetes, Docker Swarm, Amazon ECS, etc.) based on the source and destination requirements. The framework supports continuous integration/continuous delivery or deployment (CI/CD) pipelines and various container networking and storage solutions.

Figure 2:
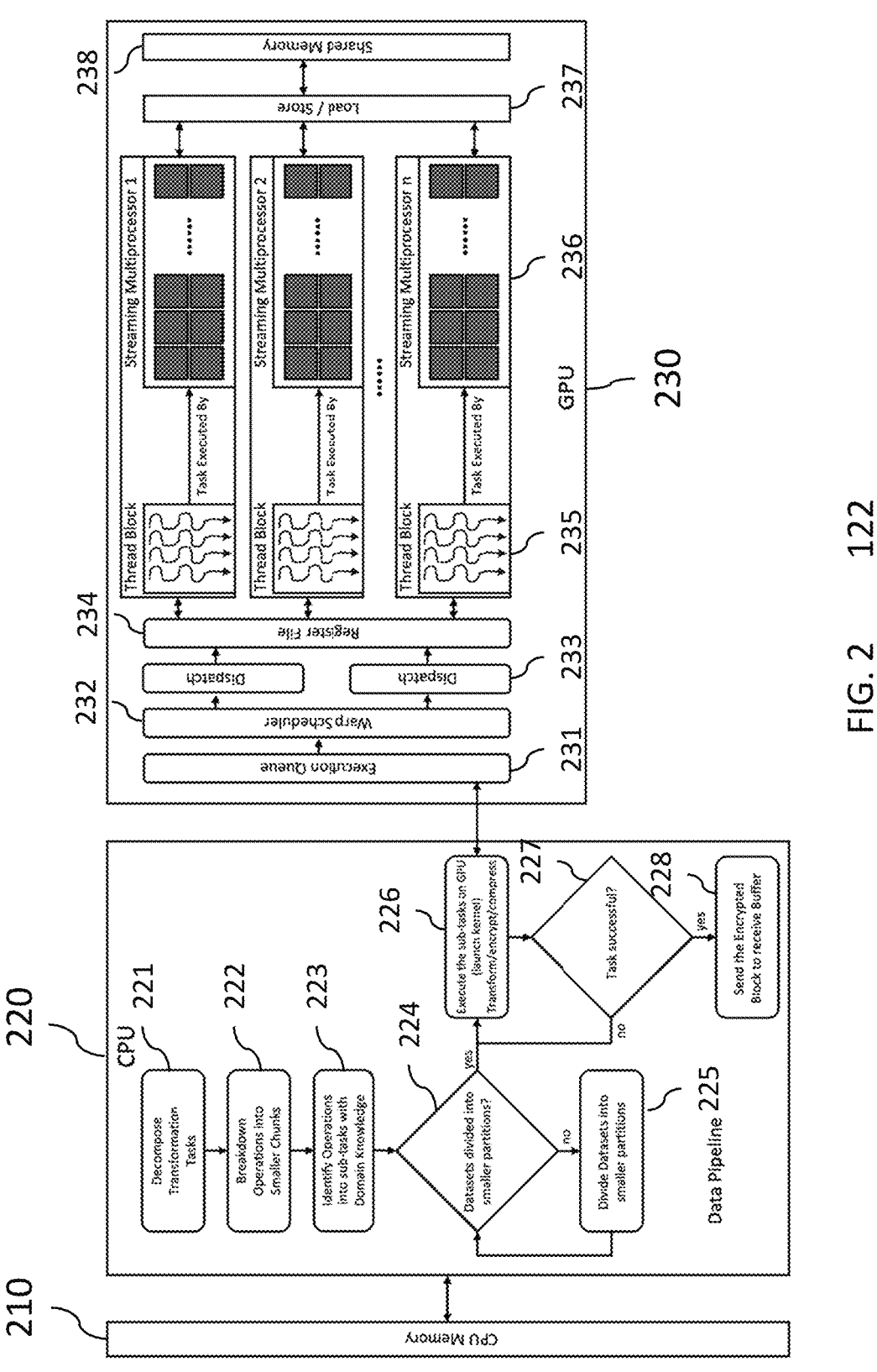
FIG. 2 is a more-detailed block diagram of the components of and the processing performed by the data extraction and processing gateway of FIG. 1.
Figure 3:
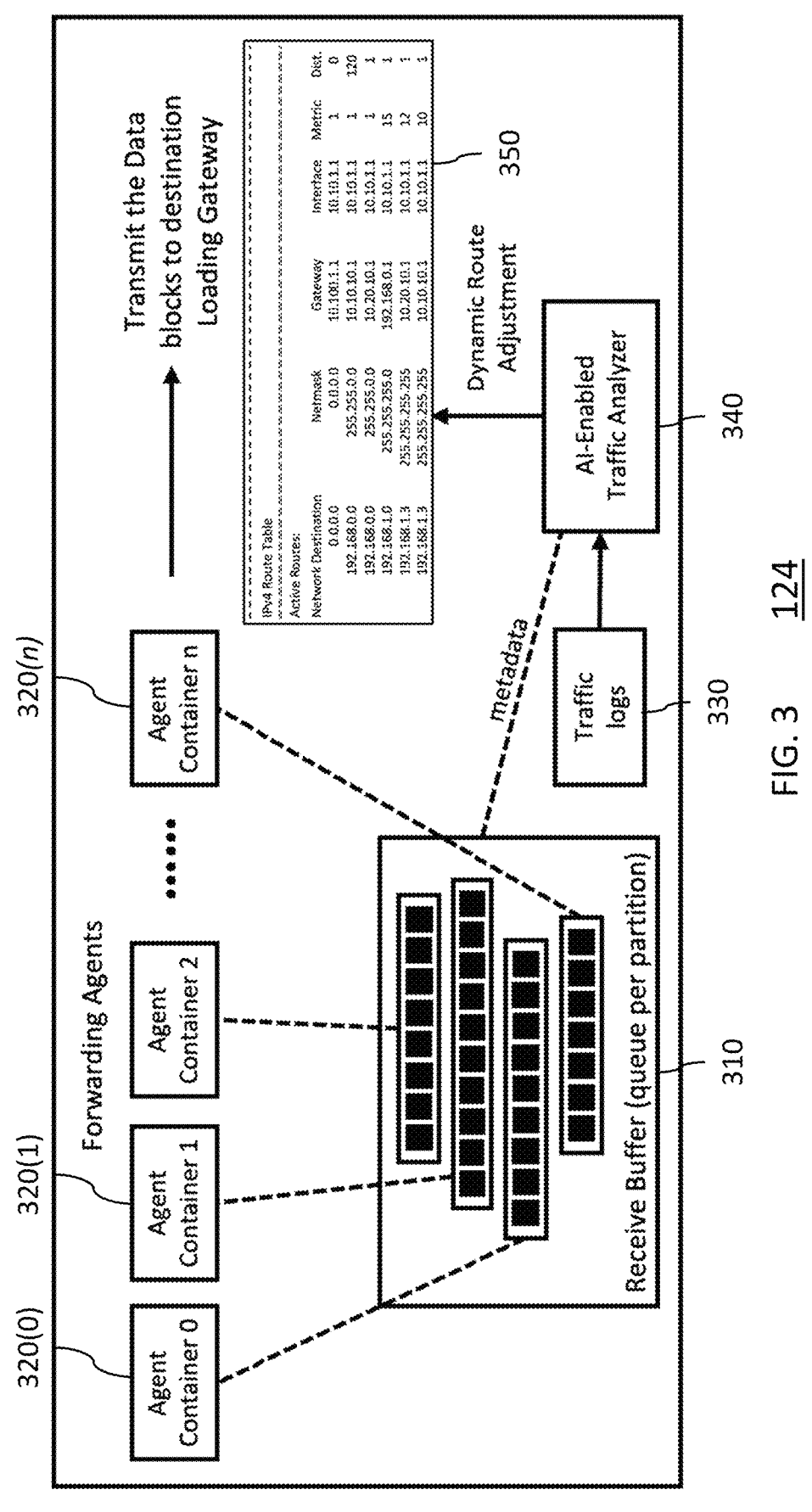
FIG. 3 is a more-detailed block diagram of the components of and the processing performed by the queue and transmission gateway of FIG. 1.
Figure 4:
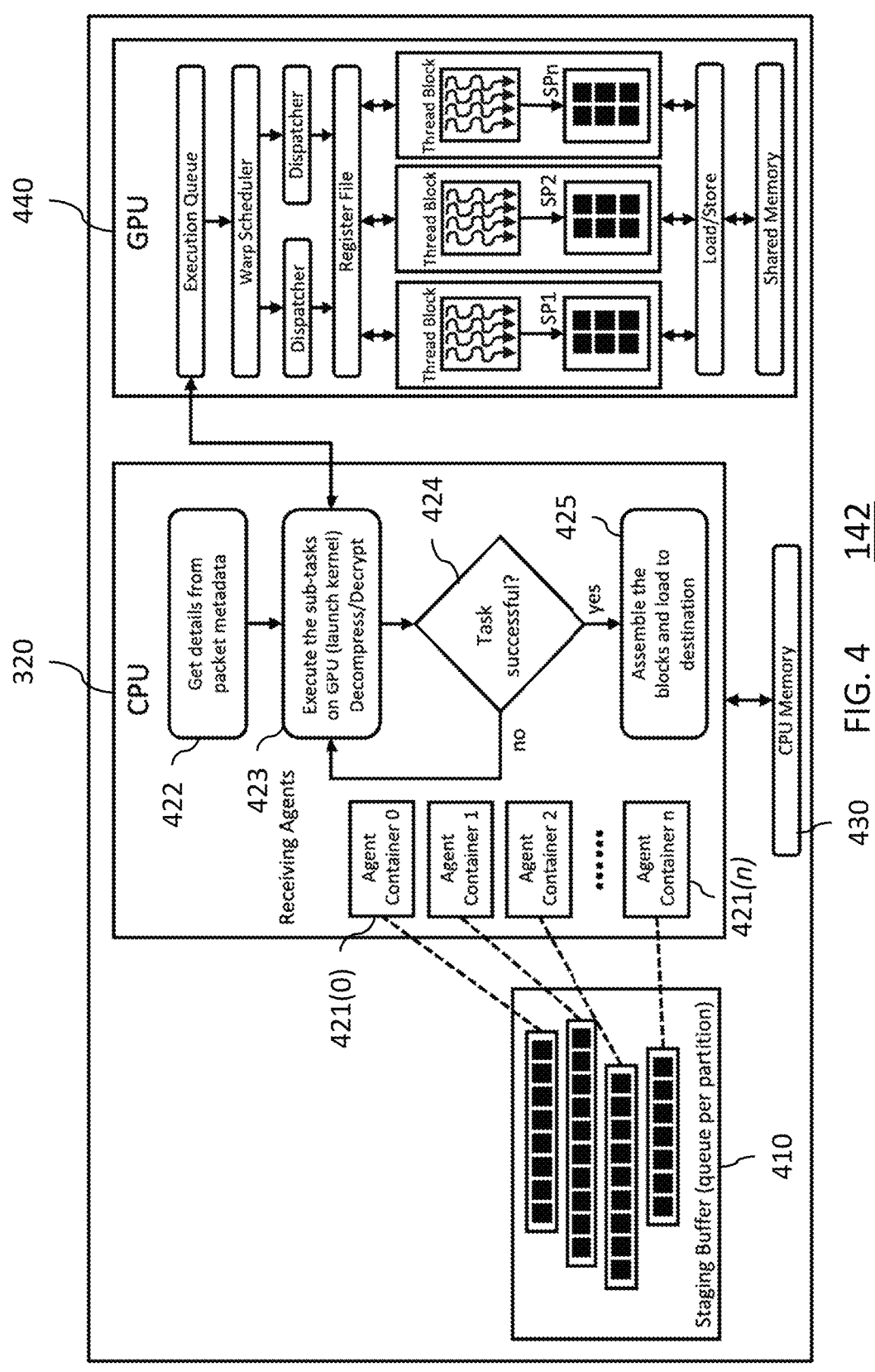
FIG. 4 is a more-detailed block diagram of the components of and the processing performed by the loading gateway of FIG. 1.

FIG. 2 is a more-detailed block diagram of the components of and the processing performed by the data extraction and processing gateway 122 of FIG. 1, FIG. 3 is a more-detailed block diagram of the components of and the processing performed by the queue and transmission gateway 124 of FIG. 1, and FIG. 4 is a more-detailed block diagram of the components of and the processing performed by the loading gateway 142 of FIG. 1.

As shown in FIG. 2, the data extraction and processing gateway 122 includes CPU memory 210, at least one CPU 220, and at least one GPU 230. The CPU 220 performs data extraction, while the GPU 230 performs transformation, encryption, lossless compression, and metadata addition.

In particular:

Step 221: The CPU 220 decomposes data transformation tasks (e.g., data cleaning, aggregation) into smaller, independent subtasks.

Step 222: The CPU 220 breaks down operations (e.g., aggregations, joins, and complex calculations) into smaller chunks that can be processed concurrently.

Step 223: The CPU 220 identifies independent operations within each transformation task by utilizing domain knowledge to determine optimal granularity for sub-tasks.

Step 224: The CPU 220 determines whether datasets (e.g., stored in CPU memory 210) have been divided into sufficiently small partitions.

Step 225: If the result of Step 224 is no, then the CPU 220 divides datasets into smaller partitions that can be processed independently.

Step 226: If the result of Step 224 is yes, then the CPU 220 executes sub-tasks simultaneously across GPU cores. As described further below, the computations (i.e., sub-tasks) are offloaded to GPU 230, by launching many (e.g., tens of thousands of) threads, all executing the same function/kernel, with each thread working on a different part of the problem. The CPU 220 ensures proper synchronization to handle dependencies between sub-tasks.

Step 227: The CPU 220 determines whether the task was successfully performed by the GPU 230. In particular, the CPU 220 implements checkpointing to handle failures during execution and uses redundant execution for critical sub-tasks.

If the result of Step 227 is no, then processing returns to Step 226.

Step 228: If the result of Step 227 is yes, then the CPU 220 sends the encrypted blocks to the receive buffer 310 of the queue and transmission gateway 124.

The execution queue 231 in the GPU 230 is a structure that holds a sequence of commands or tasks that the GPU 230 is scheduled to perform. Essentially, the execution queue 231 is a waiting line for GPU operations. These queues manage the order in which the GPU 230 processes tasks, ensuring efficient utilization of the GPU's processing power.

In CUDA, the warp scheduler 232 is a unit within a streaming multiprocessor (SM) that selects which warps (i.e., groups of, for example, 32 threads that execute in SIMT (Single Instruction, Multiple Threads) fashion) are to be executed on the GPU's processing cores. The warp scheduler 232 is responsible for efficiently scheduling these warps, aiming to maximize GPU utilization by switching between them, especially when warps encounter delays like memory access latency.

OpenCL has the concept of a "wavefront." A wavefront is a group of threads that execute in SIMT fashion. The size of a wavefront can vary depending on the hardware. OpenCL itself is a more-abstract layer, and OpenCL does not explicitly expose a "warp scheduler" in the same way as CUDA. Instead, OpenCL provides mechanisms for managing work-groups and work items (e.g., threads), which the underlying hardware then schedules.

On NVIDIA hardware, work items are grouped into warps. On AMD hardware, work items are grouped into wavefronts.

OpenCL is designed to be more platform-agnostic, so it provides a higher level of abstraction compared to CUDA, which is more tightly coupled to NVIDIA hardware. Both CUDA and OpenCL rely on the fundamental principle of grouping threads for SIMT execution to maximize GPU utilization. The actual scheduling of these thread groups is heavily dependent on the specific GPU hardware.

The dispatchers 233 are responsible for issuing instructions to the execution units, determining which groups (warp/wavefront) instructions should be processed next.

The register file 234 is a high-speed memory structure that stores the variables and intermediate results used by the threads, providing quick access to data during computation.

A thread block 235 is a group of threads that can cooperate and share data through fast shared memory. The thread block is the basic unit of work that is assigned to a streaming multiprocessor 236.

A streaming multiprocessor (SM) 236 is the core processing unit of GPU 230. Each SM 236 executes thread blocks by scheduling warps of threads onto its processing cores.

The GPU 230 contains load/store units (LSUs) 237, which are specialized hardware that handles the memory operations. Load/store operations are how data is moved into and out of shared memory and are crucial for performance.

Shared memory 238 is a relatively small, very fast memory region that is local to a group of GPU threads (typically within a thread block 235). The shared memory 238 enables threads within the same block to quickly share data, significantly reducing the need to access slower global memory.

For GPU-accelerated encryption:

The GPU 230 implements cryptographic algorithms adapted for parallel execution.

The GPU 230 uses block ciphers like AES (Advanced Encryption Standard) to operate on fixed-size data blocks, processed simultaneously by assigning each block to a separate thread.

The GPU 230 makes sure thread divergence is minimized, thereby ensuring uniform execution paths for all threads.

For GPU-accelerated lossless compression and metadata addition:

The GPU 230 uses parallel-friendly compression algorithms, such as GZIP, Zstandard and LZ4, which can be efficiently mapped to GPU architectures. These algorithms are adapted to exploit the parallelism of GPUs while minimizing thread divergence and memory bottlenecks.

Parallel threads in the GPU 230 apply the selected compression algorithm to each chunk and add metadata. This metadata includes a DatasetDestination-ID, LoadingGW-IP/FQDN, Batch-ID, partition-size & number, and decryption/decompression details.

DatasetDestination-ID is the identification information to retrieve the destination connection information that will be used by the agents in the loading gateway 142 to load data.

LoadingGW-IP/FQDN represents the loading gateway IP address or a fully qualified domain name (FQDN) which is one of the key elements for predicting optimal routing paths by an AI-driven dynamic route adjustment system.

Batch-ID is the identification of a particular batch that is being shipped to a loading gateway queue.

Partition-size is the number of blocks that belong to a particular batch and a batch can contain more than one partition. Number is the block number within the partition. Decryption/decompression details are information details used to decrypt and decompress the blocks at the loading gateway 142 by the agents.

As shown in FIG. 3, the queue extraction and transmission gateway 124 includes receive buffer 310, (n+1) forwarding agents **320(0)-320(*n*), one or more traffic logs 330, AI-enabled traffic analyzer 340, and IPv4 route table 350**. In particular:

The queue extraction and transmission gateway 124 queues encrypted and compressed blocks in the receive buffer 310, where the blocks await being picked up by the forwarding agents 320.

The AI-enabled traffic analyzer 340 performs dynamic route adjustment by continuously monitoring the metadata of the incoming blocks in the receive buffer 310 and the real-time traffic logs 330.

The traffic analyzer 340 performs feature engineering to extract relevant attributes, such as latency, jitter, packet loss, and bandwidth utilization for each LoadingGW-IP/FQDN. The traffic analyzer 340 uses this data to predict optimal routing paths.

The traffic analyzer 340 dynamically adjusts routing decisions to minimize latency, avoid congestion, and optimize resource utilization.

The forwarding agents 320, which scale in and out dynamically depending on the queue size, will fetch the blocks queued in the receive buffer 310 and transmit them to the destination (i.e., LoadingGW-IP/FQDN) via the network topology 130 of FIG. 1.

The forwarding agents 320 would retransmit a block if any issues are identified in the network 130 and/or an acknowledgment from the loading gateway 142 is missing.

As shown in FIG. 4, the loading gateway 142 includes staging buffer 410, at least one CPU 420, CPU memory 430, and at least one GPU 440. In particular:

Blocks received from the network topology 130 are queued in the staging buffer 410.

Step 422: The CPU 420 will get details about the received blocks from the packet metadata.

Step 423: (n+1) receiving agents 421, which scale in and out depending on the queue size, will process these blocks using GPU-assisted decompressing, decrypting, and assembling according to the information in the metadata.

Step 424: The CPU 420 will determine whether the task was successful.

If the CPU 420 determines that the task was not successful, then the processing returns to Step 423.

If the CPU 420 determines that the task was successful, then, in Step 425, the receiving agents 421 will read the destination connection details from the configured connection strings using the 'DatasetDestination-ID' from the block metadata and load the data to the appropriate destination AF. Each receiving agent 421 will assemble and load the blocks that belong to a single partition before picking up blocks of another partition. The receiving agents 421 will have the ability to dedupe the data blocks.

The elements within GPU 440 are analogous to the similarly named elements within GPU 230 of FIG. 2.

Figure 5:
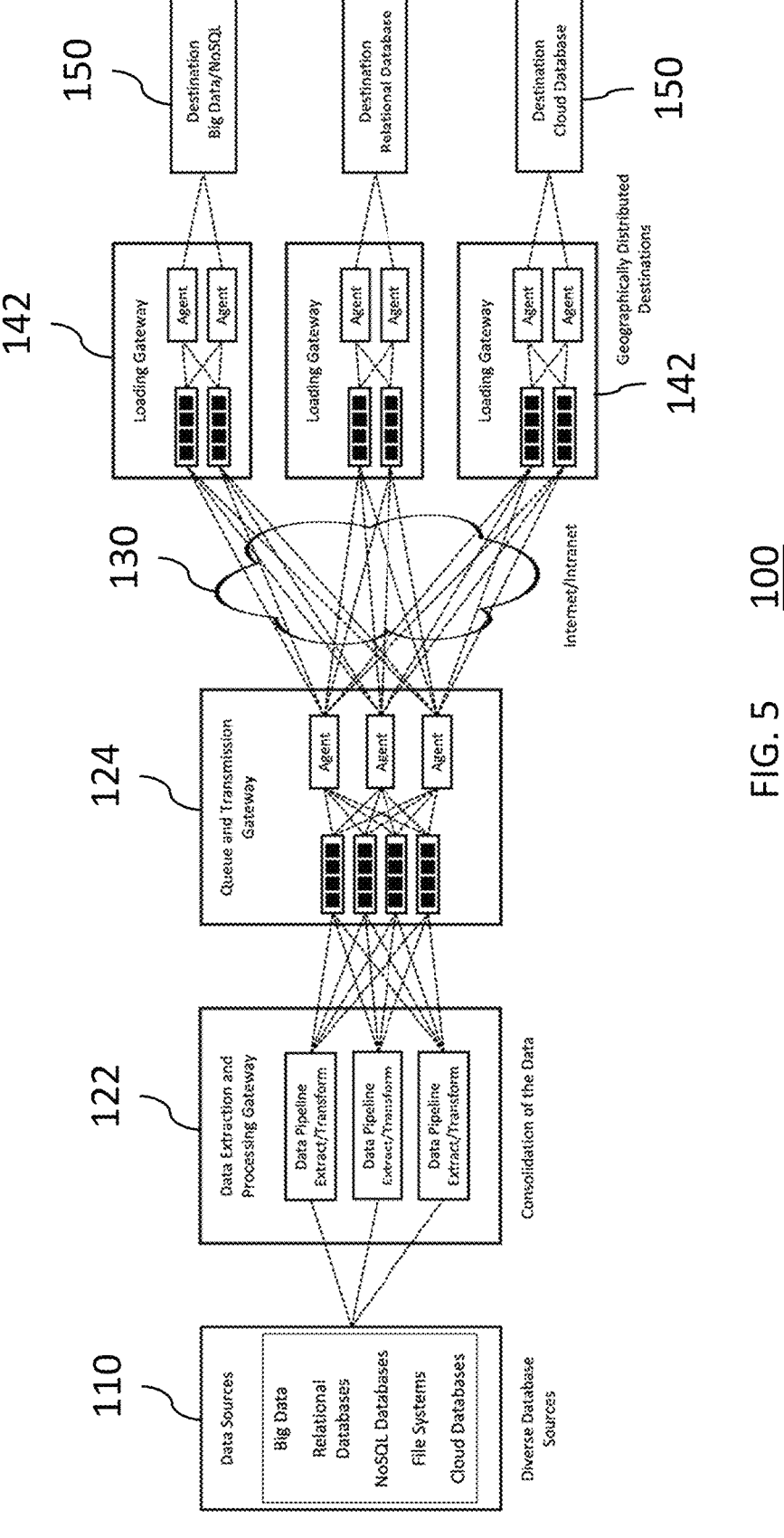
FIG. 5 is a block diagram representing a first use case for the communication system of FIG. 1.

FIG. 5 is a block diagram representing a first use case for the communication system 100 of FIG. 1 for consolidated data distribution to geographically distributed, diverse destinations. A core use case for a consolidated data distribution communication system lies in the management of large-scale, geographically dispersed infrastructure. This system would collect real-time data from diverse sources like sensors (IoT devices), databases, and operational systems, then efficiently distribute tailored subsets of this information to various destinations. This targeted distribution ensures that each stakeholder receives only the relevant data needed for their specific role, optimizing response times, and enabling proactive decision-making across a complex, geographically diverse environment, thereby enhancing operational efficiency and reliability.

Figure 6:
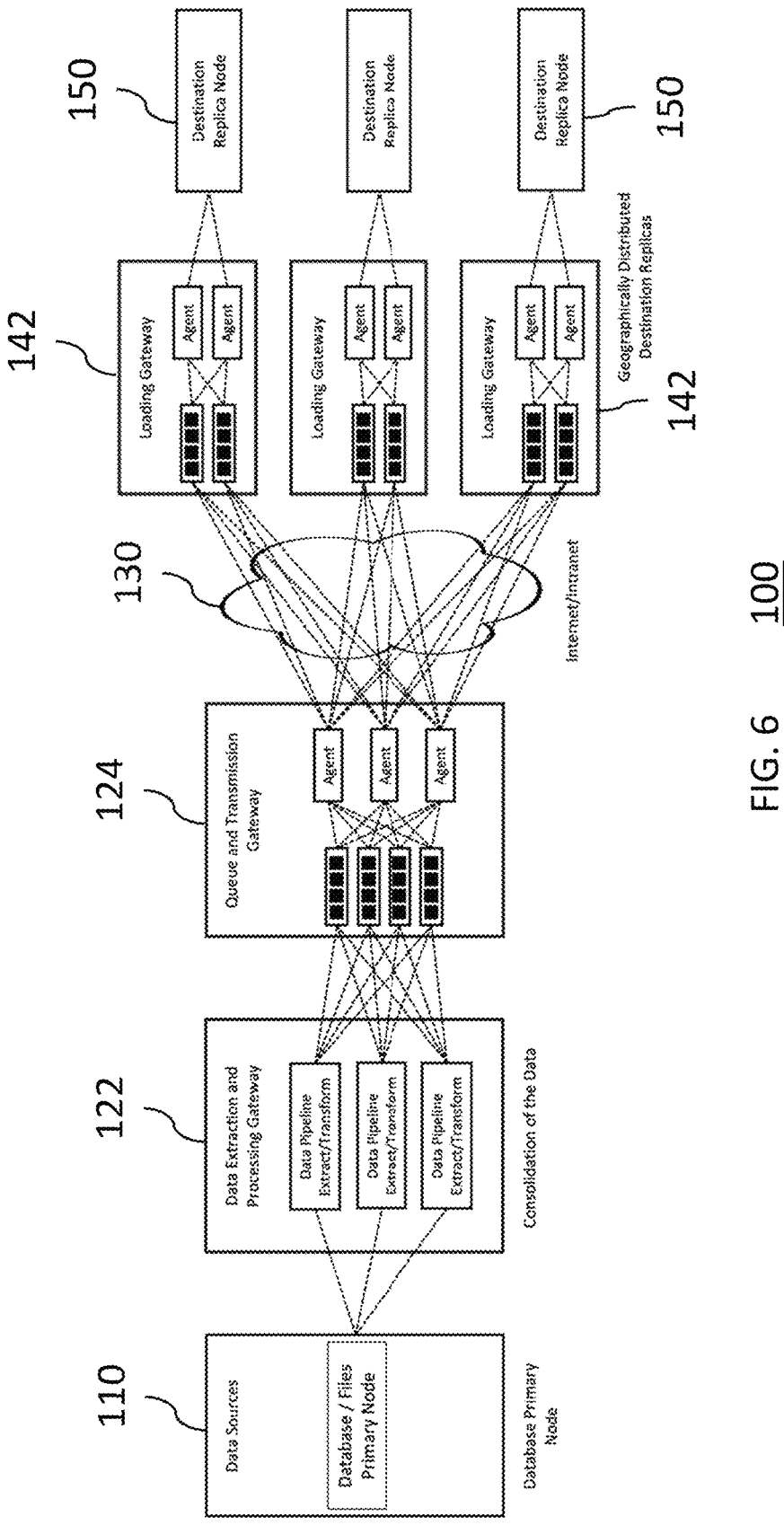
FIG. 6 is a block diagram representing a second use case for the communication system of FIG. 1.

FIG. 6 is a block diagram representing a second use case for the communication system 100 of FIG. 1 for data replication to geographically distributed, destination replicas. Another core use case for a data replication communication system is ensuring high availability and disaster recovery for critical applications. By continuously replicating data from a primary location to geographically dispersed replicas, the system guarantees that even if one location experiences a failure, operations can seamlessly continue from another. The communication system manages the consistent and efficient transfer of data updates, ensuring all replicas maintain synchronization, ultimately providing a robust and resilient infrastructure that can withstand localized failures and maintain business continuity.

FIG. 7 is a block diagram representing a third use case for the communication system 100 of FIG. 1 for data replication to geographically distributed, diverse destinations. Yet another core use case for a data replication communication system involves distributing data to diverse, geographically dispersed destinations for varying purposes. This system caters to scenarios where different stakeholders require specific data subsets and formats. For example, a global retailer might replicate sales data to a regional analytics team for localized trend analysis, inventory data to a distribution center for logistics optimization, and anonymized customer data to a marketing team for targeted campaigns. This communication system ensures that each destination receives the necessary data, transformed, and formatted appropriately for its specific needs, while maintaining data consistency across the organization. This allows for localized processing and decision-making while ensuring data integrity and enabling a unified view of information across diverse geographical locations and business units.

In certain embodiments, the present disclosure is an apparatus for a communication system having a source location that communicates with a destination location via a network topology, the source location having a data extraction and processing gateway and a queue and transmission gateway and the destination location having a loading gateway, the apparatus comprising at least one of the data extraction and processing gateway, the queue and transmission gateway, and the loading gateway. The source location comprises at least one source central processing unit (CPU) and at least one source graphics processing unit (GPU) having multiple source GPU cores. The source CPU is configured to divide incoming data into blocks and distribute the blocks of data to the source GPU cores. The source GPU cores are configured to transform, encrypt, and compress different blocks of data in parallel to generate processed blocks of data. The source CPU is configured to forward the processed blocks to data to the queue and transmission gateway. The queue and transmission gateway comprises receive buffers, a traffic analyzer, and forwarding agents. The receive buffers are configured to store the processed blocks of data received from the data extraction and processing gateway.

The traffic analyzer is configured to analyze transmission of the processed blocks of data from the queue and transmission gateway to the loading gateway via the network topology to dynamically adjust the routing of the processed blocks of data through the network topology. The forwarding agents are configured to forward the processed blocks of data stored in the receive buffers for transmission to the loading gateway. The loading gateway comprises staging buffers, at least one destination CPU, and at least one destination GPU having multiple destination GPU cores. The staging buffers are configured to store the processed blocks of data received from the queue and transmission gateway via the network topology. The destination CPU is configured to distribute the processed blocks of data to the destination GPU cores. The destination GPU cores are configured to decompress, decode, and detransform the processed blocks of data in parallel to recover the blocks of data. The destination CPU is configured to assemble the recovered blocks of data for further processing.

In at least some of the above embodiments, the apparatus comprises the data extraction and processing gateway.

In at least some of the above embodiments, the apparatus further comprises the queue and transmission gateway.

In at least some of the above embodiments, the apparatus further comprises the loading gateway.

In at least some of the above embodiments, the apparatus comprises the loading gateway.

In at least some of the above embodiments, the communication system comprises multiple loading gateways.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

As used herein in reference to an element and a standard, the terms "compatible" and "conform" mean that the element communicates with other elements in a manner wholly or partially specified by the standard and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

Signals and corresponding terminals, nodes, ports, links, interfaces, or paths may be referred to by the same name and/or label and are interchangeable for purposes here.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. An apparatus for a communication system having a source location that communicates with a destination location via a network topology, the source location having a data extraction and processing gateway and a queue and transmission gateway and the destination location having a loading gateway, the apparatus comprising at least one of the data extraction and processing gateway, the queue and transmission gateway, and the loading gateway, wherein:

the source location comprises at least one source central processing unit (CPU) and at least one source graphics processing unit (GPU) having multiple source GPU cores, wherein:

the source CPU is configured to divide incoming data into blocks and distribute the blocks of data to the source GPU cores;

the source GPU cores are configured to transform, encrypt, and compress different blocks of data in parallel to generate processed blocks of data; and the source CPU is configured to forward the processed blocks to data to the queue and transmission gateway;

the queue and transmission gateway comprises receive buffers, a traffic analyzer, and forwarding agents, wherein:

the receive buffers are configured to store the processed blocks of data received from the data extraction and processing gateway;

the traffic analyzer is configured to analyze transmission of the processed blocks of data from the queue and transmission gateway to the loading gateway via the network topology to dynamically adjust the routing of the processed blocks of data through the network topology; and the forwarding agents are configured to forward the processed blocks of data stored in the receive buffers for transmission to the loading gateway; and the loading gateway comprises staging buffers, at least one destination CPU, and at least one destination GPU having multiple destination GPU cores, wherein:

the staging buffers are configured to store the processed blocks of data received from the queue and transmission gateway via the network topology;

the destination CPU is configured to distribute the processed blocks of data to the destination GPU cores;

the destination GPU cores are configured to decompress, decode, and detransform the processed blocks of data in parallel to recover the blocks of data; and the destination CPU is configured to assemble the recovered blocks of data for further processing.

2. The apparatus of claim 1, wherein the apparatus comprises the data extraction and processing gateway.

3. The apparatus of claim 2, wherein the apparatus further comprises the queue and transmission gateway.

4. The apparatus of claim 3, wherein the apparatus further comprises the loading gateway.

5. The apparatus of claim 1, wherein the apparatus comprises the loading gateway.

6. The apparatus of claim 1, wherein the communication system comprises multiple loading gateways.

7. A method for a communication system having a source location that communicates with a destination location via a network topology, the source location having a data extraction and processing gateway and a queue and transmission gateway and the destination location having a loading gateway, wherein:

the source location comprises at least one source central processing unit (CPU) and at least one source graphics processing unit (GPU) having multiple source GPU cores, wherein:

the source CPU divides incoming data into blocks and distributes the blocks of data to the source GPU cores;

the source GPU cores transform, encrypt, and compress different blocks of data in parallel to generate processed blocks of data; and the source CPU forwards the processed blocks to data to the queue and transmission gateway;

the queue and transmission gateway comprises receive buffers, a traffic analyzer, and forwarding agents, wherein:

the receive buffers store the processed blocks of data received from the data extraction and processing gateway;

the traffic analyzer analyzes transmission of the processed blocks of data from the queue and transmission gateway to the loading gateway via the network topology to dynamically adjust the routing of the processed blocks of data through the network topology; and the forwarding agents forward the processed blocks of data stored in the receive buffers for transmission to the loading gateway; and the loading gateway comprises staging buffers, at least one destination CPU, and at least one destination GPU having multiple destination GPU cores, wherein:

the staging buffers store the processed blocks of data received from the queue and transmission gateway via the network topology;

the destination CPU distributes the processed blocks of data to the destination GPU cores;

the destination GPU cores decompress, decode, and detransform the processed blocks of data in parallel to recover the blocks of data; and the destination CPU assembles the recovered blocks of data for further processing.

8. The method of claim 7, wherein the method is performed by the data extraction and processing gateway.

9. The method of claim 8, wherein the method is further performed by the queue and transmission gateway.

10. The method of claim 9, wherein the method is further performed by the loading gateway.

11. The method of claim 7, wherein the method is performed by the loading gateway.

12. The method of claim 7, wherein the communication system comprises multiple loading gateways.

* * * * *